M. M. A. Gouilloud
Andre Levy
INVENTORS

BY Edward M. Roney

ATTORNEY

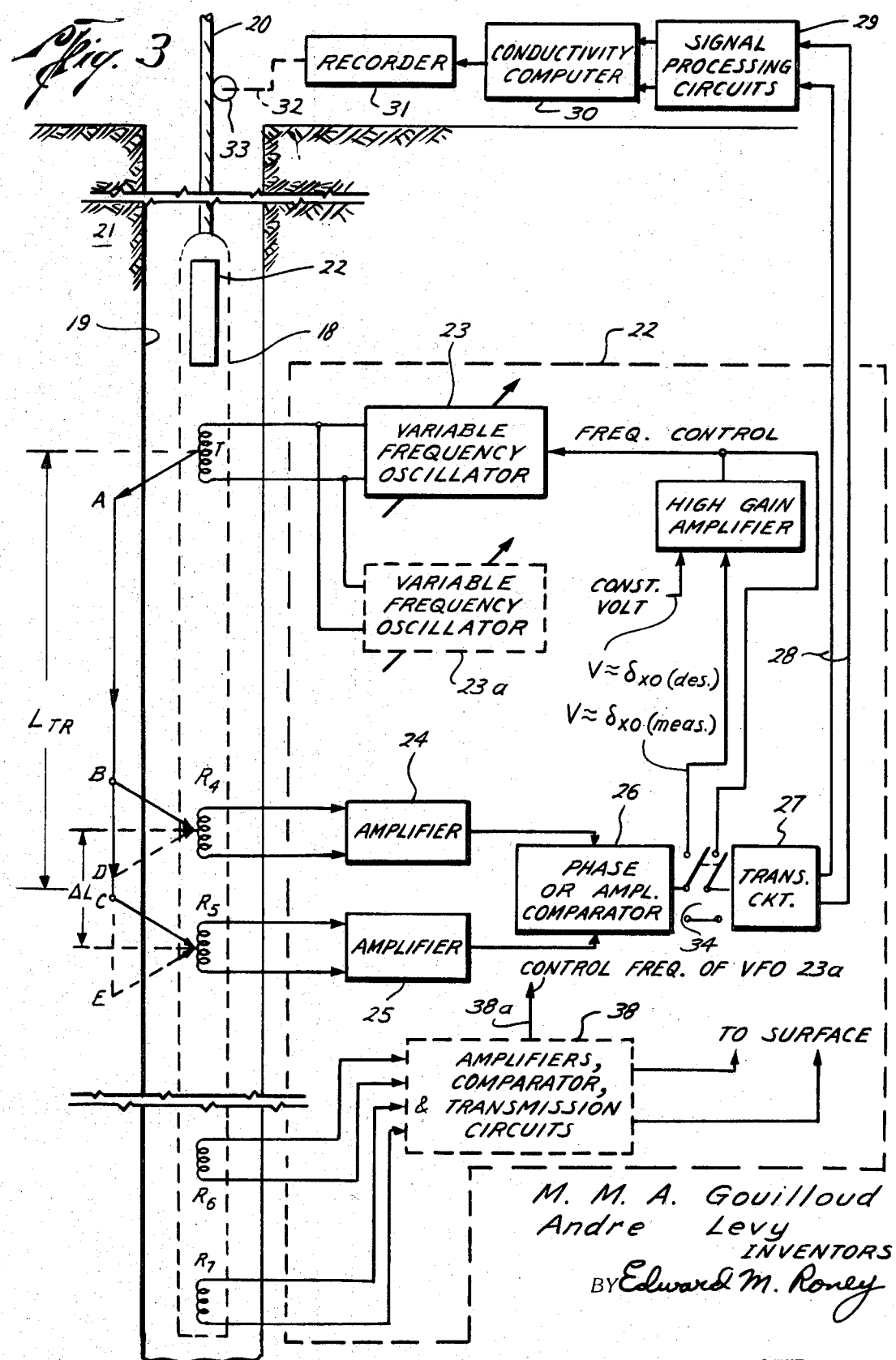

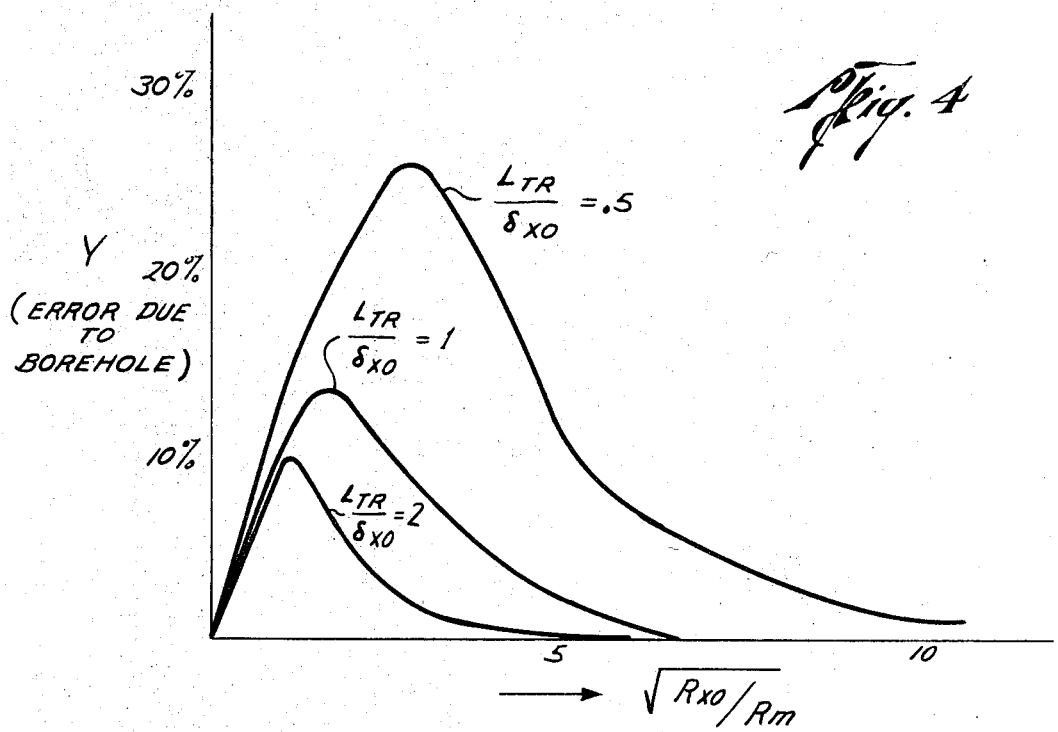
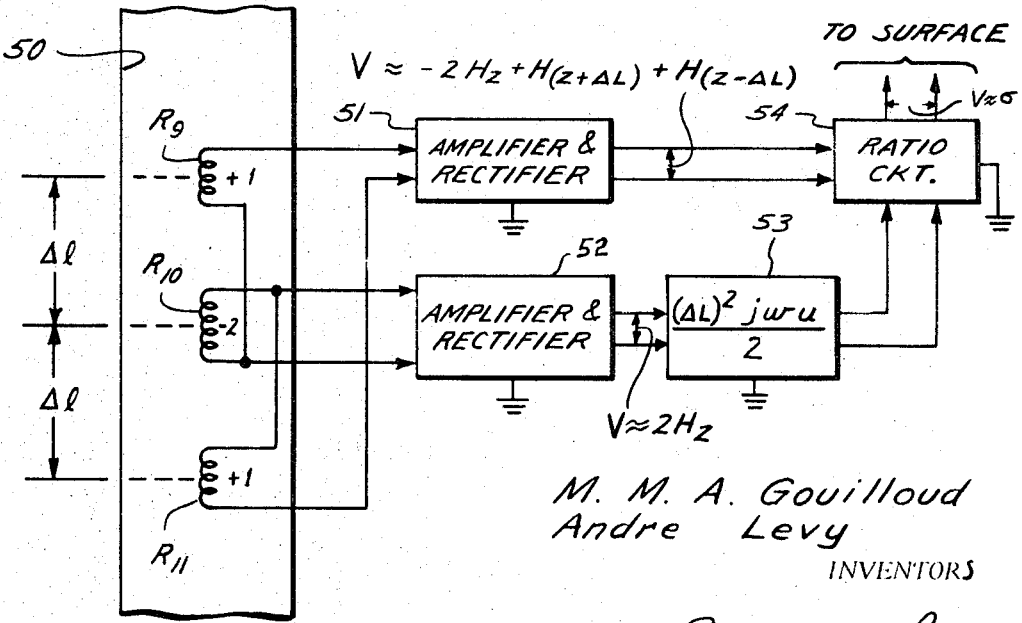

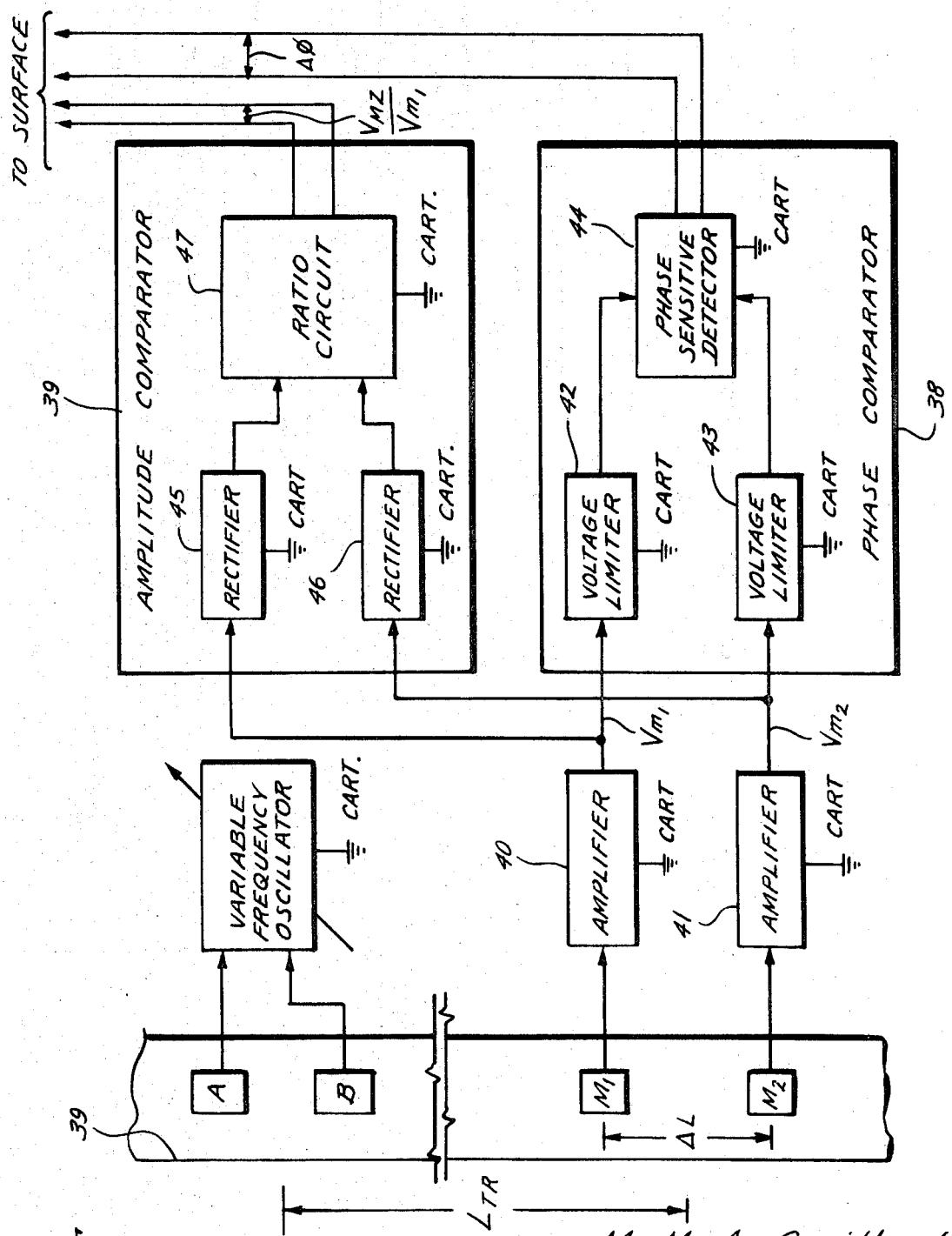

3,551,797
**HIGH FREQUENCY ELECTROMAGNETIC WELL
LOGGING METHODS AND APPARATUS**
Michel Marie Albert Gouilloud, Houston, Tex., and André
 Levy, Paris, France, assignors to Societe de Prospection
 Electrique Schlumberger, S.A., Paris, France, a corpo-
 ration of France
Filed Sept. 28, 1967, Ser. No. 671,255
Claims priority, application France, Sept. 29, 1966,
78,146
Int. Cl. G01v 3/12, 3/18
U.S. Cl. 324—6                                    17 Claims

ABSTRACT OF THE DISCLOSURE

The particular embodiments described herein as illustrative of the invention describe techniques for investigating earth formations traversed by a borehole by emitting electromagnetic energy from a transmitter into the adjoining formations. The parameters of the investigating system are selected such that the electromagnetic energy will propagate through the formations. This propagating electromagnetic energy is received by a plurality of receivers, spaced a suitable distance from the transmitter, to provide a measure of a characteristic of the adjoining formations.

---

This invention relates to methods and apparatus for evaluating earth formations by utilizing electromagnetic energy. More particularly, the invention relates to the measurement of the resistivity or conductivity of earth formations by propagating electromagnetic energy through the formations and measuring certain propagation characteristics of this electromagnetic energy.

In the investigation of earth formations adjoining a borehole, a great many types of investigating apparatus have been utilized heretofore. One class of such investigating apparatus utilizes electromagnetic field phenomena for investigating the formations. One type of such investigating apparatus is the so-called "electrode logging" apparatus which utilizes an electric field in the adjoining formations to produce a measure of the resistivity or conductivity thereof. Another such type of investigating apparatus is the so-called "induction logging" investigating apparatus which utilizes a magnetic field in the formations to produce a secondary current flow in the formations. This secondary current flow then sets up a second magnetic field which induces current in one or more nearby receiver coils, which current is proportional to the secondary current flow and thus proportional to the conductivity of the formations.

In both the electode and induction type of apparatus used heretofore, it has been necessary to maintain the operating frequency low enough that the field setup in the formations can be classified as a static or "quasi static" electromagnetic field. By static or quasi static field, it is meant that the field setup at one point in the formations will have negligible effect on the field at another point in the formations. This has resulted in the so-called "geometrical factor theory" utilized in induction logging.

It is known that, if the frequency of the transmitter current, i.e., the current supplied to the transmitter coil in induction logging or current emitting electrode in electrode logging, is appreciable, the static field theory becomes somewhat distorted due to "skin effects." This "skin effect" phenomena is caused by both self inductance and mutual interaction between the circulating currents induced in the formations being studied. It denotes a redistribution of the formation current flow in an effort to cause more of the current flow to occur in regions where the effective electrical impedance is less. It is the same type of phenomena which is encountered in high frequency operation of other types of electrical circuits and devices. Unless special skin effect correction circuits are utilized, this skin effect phenomena can cause appreciable errors in the measurements. To avoid having the field altered by this "skin effect" and the resulting accuracy problems, the frequency has always been maintained relatively low in well logging systems. In this connection, it would be desirable to have a logging technique where this alteration of the field setup in the formations by skin effect is no longer a problem.

One parameter of the adjoining earth formations, which it is desired to measure is the resistivity $R_{xo}$ of the so-called "invaded zone" next to the borehole. The invaded zone is the region in which the drilling mud invades the formations adjacent to the borehole, thus forcing the formation fluids away from the borehole. In measuring the resistivity of this invaded zone in the past, it has generally been found necessary to use electrode systems. Many times, it has been found desirable to use so-called pad mounted electrode investigating systems in which the electrodes are mounted on pads located in close proximity to the wall of the borehole.

In either case, certain problems are encountered in using such electrode type systems at the same time that an induction logging apparatus is being utilized. The reason for this is that the metal construction of the electrodes may have currents induced therein from the induction logging apparatus which may cause errors in the conductivity measured by the induction logging system. Additionally, when a pad mounted electrode apparatus is utilized, the speed of ascent through the borehole is limited. In this connection, it would be desirable to provide "coil type" investigating apparatus for investigating this invaded zone of the earth formations for use in conjunction with the usual "induction logging" apparatus.

It is therefore an object of the invention to provide new and improved methods and aparatus for investigating subsurface earth formations.

In accordance with the present invention, methods and apparatus for investigating earth formations traversed by a borehole comprise emitting electromagnetic energy into the adjacent earth formations at a frequency which enables the electromagnetic energy to propagate through the formations. The methods and apparatus furthermore provide a measure of a characteristic of at least a portion of the earth formations in response to the propagating electromagnetic energy. This measure of the characteristic of the adjoining formations can be accomplished by measuring at least one factor of the electromagnetic propagation constant of said portion of the earth formations.

For a better understanding of the present invention together with other and further objects thereof, reference is had to the following description taken in connection with the accompanying drawings, the scope of the invention being pointed out in the appended claims.

Referring to the drawings:

FIG. 3 shows a coil array in a borehole along with a schematic representation of electrical circuitry utilized in connection with the coil array for investigating earth formations in accordance with the present invention;

FIG. 4 represents graphically certain factors which should be considered in determining the transmitter to receiver spacing as well as the operating frequency of the apparatus of FIG. 4;

FIG. 5 shows an electrode array disposed in a borehole along with schematic representations of electrical circuitry that can be utilized in accordance with the present invention; and FIG. 6 shows apparatus arranged in accordance with another feature of the invention.

Figure 1:
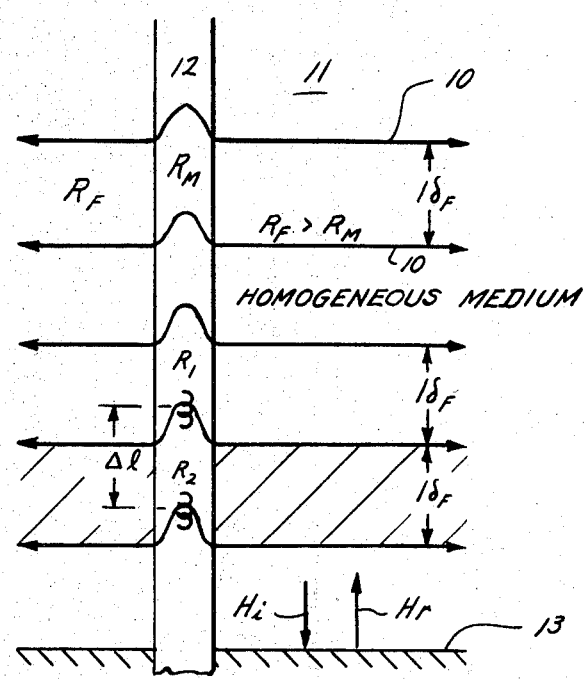
FIG. 1 shows a borehole drilled into the earth along with diagrams of equiphase lines produced by electromagnetic waves propagating through the borehole and the surrounding formations.

The relationship for the magnetic field strength $H_z$ at any distance $z$, for large values of $z$, from a transmitter, as derived from Maxwell's equations, can be written as:

$$H_z = H_0 e^{-\frac{z}{\delta}(1+j)} \quad (1)$$

where $e$ is the natural logarithm base, 2.718, $H_0$ is the magnetic field strength at the transmitter, $j=\sqrt{-1}$, and $\delta$ is the skin depth which can be defined as:

$$\delta = \sqrt{\frac{2}{\omega\mu\sigma}} \quad (2)$$

where $\omega$ is the radian frequency of the transmitter signal ($2\pi$ times the frequency), $\mu$ is the magnetic permeability of the formation under consideration and is generally considered to be a constant, and $\sigma$ is the conductivity of the formation under consideration.

Equation 1 can be rewritten for the electric field case by substituting E for H. Equation 1 expresses that the propagating electromagnetic field will be attenuated and phase shifted as the distance term $z$ increases, i.e., as the electromagnetic energy propagates through the formations. The degree of phase shift is expressed by the $-jz/\delta$ term of Equation 1 and the degree of attenuation is expressed by the $-z/\delta$ term of Equation 1. Thus, the term $$\frac{-1}{\delta}(1+j)$$

is defined as the propagation constant, the $1/\delta$ term being the attenuation constant and the $$-j\frac{1}{\delta}$$

term being the phase constant. Equation 1 also tells us that an electromagnetic wave will attenuate by a factor of $1/e$ per skin depth $\delta$ and will be phase shifted by one radian for each skin depth $\delta$ of travel.

As stated earlier, in the usual induction or electrode logging systems, the operating frequency is maintained sufficiently low such that static or quasi static field theory will apply. This, in effect, means that the field setup at one point in the formations by the transmitter will have negligible effect on the field at other points in the formation. However, for this static or quasi static field theory to apply, the operating frequency must be sufficiently low that the skin depth in the formations will be much, much greater than the spacing between the transmitter and receivers. This can be better seen from Equation 1 where, if the skin depth $\delta$ is much greater than $z$, $H_z$ will be substantially equal to $H_0$ for any small value of $z$.

In contrast with the static or quasi static field theory utilized in induction or electrode logging, the present invention is based on an increase of the frequency of operation of the well logging system to a point where the skin depth is of the order of magnitude of the transmitter to receiver spacing and is, in fact, usually smaller than this spacing. Due to the substantial increase in the frequency over the usual induction or electrode logging operating frequency, the static or quasi static field theory utilized in connection with these prior logging systems no longer applies. Instead, the electromagnetic field setup at one point in the formations will have a substantial effect on the field at other points in the formation, thus giving rise to a propagating electromagnetic wave. This can be seen from Equation 1 where, if the skin depth $\delta$ is of the order of magnitude or less than the distance $z$, the magnetic field strength will vary as an exponential function of the distance $z$.

Now referring to FIG. 1, there are shown equiphase lines 10 produced by plane electromagnetic waves propagating through a formation 11 and bore hole 12. A very similar drawing could be made using field attenuation. In this FIG. 1 case, the resistivity of the formation 11, designated $R_f$, is considered to be greater than the resistivity of the mud, designated $R_m$. This gives rise to the equiphase lines in the mud column lagging those in the formation. These equiphase lines are represented as one skin depth apart. To produce such plane waves, the transmitter is considered to be at some considerable distance from the receivers $R_1$ and $R_2$. The transmitter and receivers are utilized to emit or receive electromagnetic energy and can thus be called antennas. These transmitting and receiving antennas could be comprised of either electrodes or coils.

Since the mud column 12 is dimensionally smaller than the remainder of the formation, substantially all of the energy propagating through the earth will be propagating through the formation instead of the mud column and thus the spacing between equiphase lines in the mud column will be the same as the spacing between equiphase lines in the formation. Therefore, by placing a pair of receivers $R_1$ and $R_2$ a distance $\Delta l$ apart in the borehole 12, and comparing the phase of the signals received by the two receivers $R_1$ and $R_2$, the skin depth in the hatched line portion of the formation between the equiphase lines which couple with the receivers $R_1$ and $R_2$ can be measured. The relationship for this phase difference $\Delta\phi$ can be represented as:

$$\Delta\phi = \frac{\Delta l}{\delta} \quad (3)$$

$$\delta = \frac{\Delta l}{\Delta\phi} \quad (4)$$

Thus, it can be seen from Equation 4 that a measure of the phase difference will, in effect, provide a measure of the skin depth $\delta_F$ of the formation. This phase difference may also be termed the phase gradient. Since skin depth is functionally related to the conductivity of the formations per Equation 2, a measure of the skin depth $\delta_F$ will also provide a measure of conductivity $\sigma_F$ of the formation. Thus, substituting Equation 2 into Equation 4 and solving for the conductivity $\sigma_F$:

$$\sigma_F = K\Delta\phi^2$$

where $$K = \frac{2}{\omega\mu\Delta l^2} \quad (5)$$

In addition to measuring the phase difference between the two receivers $R_1$ and $R_2$, the amplitude gradient could also be measured to provide a measure of skin depth. This is based on the theory mentioned earlier that the electromagnetic wave will attenuate by a factor of $1/e$ for each skin depth of travel. The portion of the formation investigated will be the hatched line portion in FIG. 1 in the same manner as for the phase measurement case since the equiphase lines of FIG. 1 can also be considered to be equiamplitude lines. Since it may be desirable to measure the attenuation constant of the formation, as previously mentioned, the amplitude measurement should be normalized to eliminate absolute amplitude as a factor in the measurements. This can be accomplished by taking the ratio of the amplitudes received by the two receivers. The relationship for this amplitude ratio $A_2/A_1$ can be written as:

$$\frac{A_2}{A_1} = e^{\frac{\Delta l}{\delta}} \quad (6)$$

where $A_2$ is the amplitude of the signal received by receiver $R_2$ and $A_1$ is the amplitude of the signal received by receiver $R_1$ (i.e., the voltage received). Solving Equation 6 for the conductivity $\sigma_F$, we have:

$$\sigma_F = \frac{2K_1}{\omega\mu(\Delta l)^2} \ln^2\left(\frac{A_1}{A_2}\right) \quad (7)$$

where $K_1$ is a proportionality constant representative of such things as the geometry of the receivers.

Figure 2:
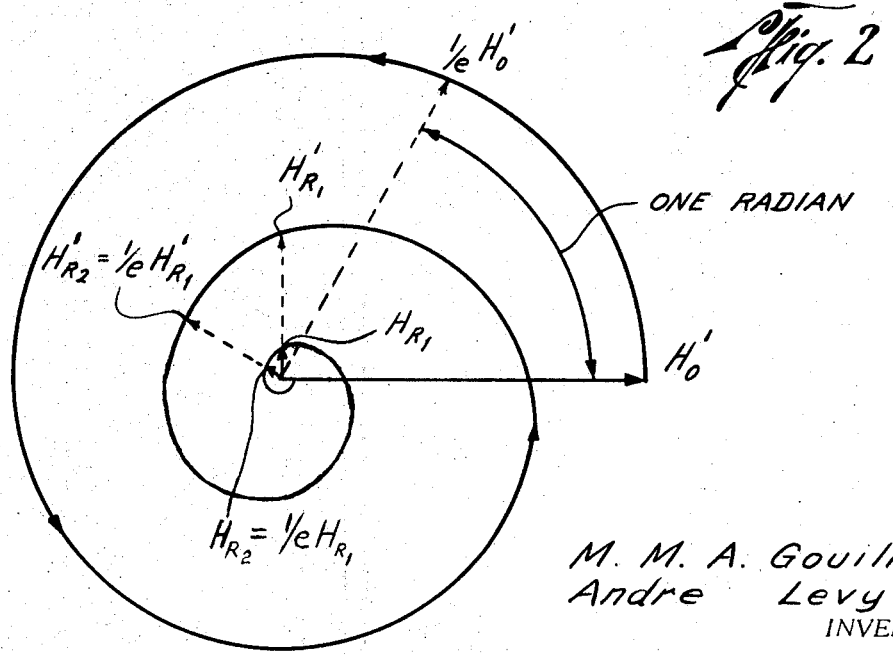
FIG. 2 shows a phasor diagram of the magnitude and phase of the electromagnetic fields as they propagate through the earth.

Refering now to FIG. 2, there is shown a phasor diagram of the magnetic field strength as the electromagnetic wave propagates through the formation. The field strength vector $H'_0$ of FIG. 2 represents the intensity at some point above the receivers $R_1$ and $R_2$ (not at the transmitter). As the electromagnetic wave propagates through the earth, the field strength is attenuated by a factor of $1/e$ and phase shifted by one radian per skin depth of travel, as discussed earlier. The field strength vectors $H_{R_1}$ and $H_{R_2}$ represent the intensities at the receivers $R_1$ and $R_2$. A signal is induced in the receivers $R_1$ and $R_2$ proportional to these field strength vectors $H_{R_1}$ and $H_{R_2}$ respectively. By comparing the phase or amplitude of these two field strength vectors $H_{R_1}$ and $H_{R_2}$ to provide a measure of the phase or amplitude gradient of the magnetic field in the vicinity of the receivers, the phase or attenuation constant of the propagating electromagnetic energy in the vicinity of the receivers $R_1$ and $R_2$ can be determined. This will then give a measure of the skin depth $\delta_F$ of the formation. Then, the conductivity $\sigma_F$ of the formation can be determined from Equation 5 or 7.

The phase or attenuation constant measured by the receivers $R_1$ and $R_2$ will only be affected by the hatched line portion of formation in FIG. 1 because of the differential receiver arrangement, as mentioned earlier. Thus, the effect on the propagating electromagnetic wave of the formations above this hatched lined formation portion will effectively be cancelled out by the differential receiver arrangement. In other words, the first or upper receiver $R_1$, in effect, acts as a reference for the second or lower receiver $R_2$. This can better be seen in FIG. 2 by viewing the vector $H_{R_1}$ as being the reference phase and amplitude for the second vector $H_{R_2}$. Thus, it can be seen that any influence on the electromagnetic wave prior to the time it reaches the first or upper receiver $R_1$ will have substantially no effect on the measurement at the two receivers $R_1$ and $R_2$.

Taking an example of this, assume that the receivers $R_1$ and $R_2$ are spaced one skin depth $\delta_F$ apart, as depicted in FIG. 1. In this event, the vector $H_{R_2}$ will be equal to $1/e \; H_{R_1}$ and be phase shifted by one radian from $H_{R_1}$. The ratio $H_{R_2}/H_{R_1}$ is then equal to $$\frac{\frac{1}{e}H_{R_1}}{H_{R_1}} = \frac{1}{e}$$

thus indicating that the receivers $R_1$-$R_2$ are spaced one skin depth $\delta_F$ apart. Now, assume that a formation above the receiver array $R_1$-$R_2$ is more highly resistive than originally assumed for the phasor diagram of FIG. 2. In this event, the field strength vectors may take on the form depicted by the field strength vectors $H'_{R_1}$ and $H'_{R_2}$. The vector $H'_{R_2}$ will be equal to $1/e \; H'_{R_1}$. Thus, the amplitude ratio $$\frac{H'_{R_2}}{H'_{R_1}} = \frac{\frac{1}{e}H'_{R_1}}{H'_{R_1}} = \frac{1}{e}$$

and the phase difference is still one radian. Thus, the differential receiver arrangement will still indicate that the measured skin depth $\delta_F$ is equal to the receiver $R_1$-$R_2$ spacing $\Delta l$.

The discussion heretofore has assumed that the formations are homogeneous and that the transmitter to receiver spacing is sufficiently great to allow for the electromagnetic waves to be considered as plane waves. By making these assumptions, the explanation was greatly simplified. However, in practice, the formations to be measured are not homogeneous and if the transmitter-receiver spacing were too great, it is clear that, due to the high attenuation of the electromagnetic waves in the formations, there would be very little, if any, energy to measure at the receivers. If desired, an equiphase plot of the electromagnetic energy for this nonhomogeneous case could be made, in which case, it would be found that the radial investigation of the formations can be selected in a desired manner by properly selecting the operating frequency and transmitter to receiver spacing. For example, it may be desirable to investigate the so-called "invaded zone" or the "noninvaded" or clean formation zone. This "noninvaded" zone is the zone which has not been invaded by the borehole mud and is the farthest removed zone from the borehole.

Before discussing how the operating frequency and transmitter-receiver spacings can be selected, it would first be desirable to describe apparatus for measuring the phase or attenuation constant in accordance with the previously discussed theory. Thus referring to FIG. 3, there is shown an investigating apparatus 18 lowered into a borehole 19 on the end of an armored multiconductor cable 20 for investigating subsurface earth formations 21. The cable is wound or un-wound by a suitable drum and winch mechanism (not shown). The investigating apparatus 18 includes a coil array comprising a transmitter coil T and two receiver coils $R_4$ and $R_5$. The intermediate point between the receiver coils $R_4$ and $R_5$ is a distance $L_{tr}$ from the transmitter coil T and the two receiver coils $R_4$ and $R_5$ are spaced a distance $\Delta L$ apart. The investigating apparatus 18 also includes a fluid-tight electronic cartridge 22 which houses the downhole electronic circuitry. This electronic circuitry is shown in the dotted line box 22 to the side of the borehole.

Now concerning this electronic circuitry, a variable frequency oscillator 23 energizes the transmitter T which emits electromagnetic energy for propagation through the formations. The receivers $R_4$ and $R_5$ have a voltage induced therein proportional to the energy of this propagating electromagnetic wave at the receivers in the manner previously discussed. The receivers $R_4$ and $R_5$ are coupled to a pair of matched amplifiers 24 and 25 which act to amplify the signals picked up by the receivers $R_4$ and $R_5$. These amplifiers 24 and 25 are matched so that any drift in the amplifiers, due to such things as temperature, will have an equal effect on both amplifiers, and thus substantially cancel out because of the differential receiver arrangement. The amplified signals from amplifiers 24 and 25 are applied to a phase or amplitude comparator 26. Whether the circuit element 26 is a phase comparator or an amplitude comparator will depend on whether the phase or attenuation constant is being measured in accordance with Equation 4 or 6 to determine the skin depth $\delta$, and thus the conductivity $\sigma$.

The resulting phase or amplitude comparator signal from phase or amplitude comparator 26 is applied to a transmission circuit 27 via a double-pole-double-throw switch 34 for transmission to the surface of the earth over a conductor pair 28 which, in reality, passes via the armored multiconductor cable 20 to the surface of the earth. If the phase or amplitude comparator 26 is of the type which converts the applied input signals to a DC signal proportional to the compared phase or amplitude, transmission circuit 27 could merely be an amplifier. On the other hand, if the phase or amplitude comparator 26 does not convert the compared signals to a DC signal, the transmission circuit 27 could be a suitable circuit for transmitting high frequency signals over the conductor pair 28 to the surface of the earth, as for example, a mixer circuit to reduce the transmission frequency to a frequency within the transmission capabilities of the cable.

At the surface of the earth the conductor pair 28 supplies the measured phase or attentuation signal to suitable signal processing circuits 29, which provide for example, suitable amplification and gain control. Additionally, if the signal transmitted up the cable 28 is an AC signal instead of a varying DC signal, signal processing circuit 29 could provide suitable rectification of the transmitted signals. Since the signal transmitted up the cable conductors 28 to the surface are representative of either the phase or attenuation constant of the propagation constant in accordance with either Equation 4 or 6 in this FIG. 3 embodiment, the signals from signal processing circuits 29 are applied to a suitable conductivity computer 30 for computing the conductivity $\sigma$ measured by the downhole investigating apparatus in accordance with either Equation 5 or 7. The resulting conductivity $\sigma$ is recorded by a recorder 31 which is driven as a function of borehole depth via a shaft 32 coupled to a rotating wheel 33. The rotating wheel 33 is in contact with the cable 20 so as to rotate in accordance therewith and thus cause the recording medium of recorder 31 to move as a function of borehole depth. Thus, the conductivity $\sigma$ will be recorded as a function of borehole depth by recorder 31. If desired, the conductivity computer 30 could be omitted in favor of suitable calibration of the lines on the recording medium of recorder 31, or alternatively, the phase or amplitude function $\Delta\varphi$ or $A_{R_5}/A_{R_4}$ could be recorded directly on recorder 31.

In operation, the transmitter T, operating at a constant frequency, emits continuous electromagnetic energy into the surrounding media which electromagnetic energy is continuously measured by the differential receiver arrangement and a phase or attenuation signal is transmitted to the surface of the earth to provide indications of conductivity by the recorder 31. This differential receiver arrangement then includes the receivers $R_4$ and $R_5$ as well as the amplifiers 24 and 25 and the comparator 26.

The emited electromagnetic energy can, for purposes of providing a simple explanation, be considered as taking the path represented by the arrows in FIG. 3. The energy received by the receiver $R_4$ travels the path T–A–B–$R_4$ and the energy received by the receiver $R_5$ travels the path T–A–B–C–$R_5$. It can be seen that the energy traveling the path T–A–B is common to both receivers $R_4$ and $R_5$. Likewise, it can be assumed that the paths B–$R_4$ and C–$R_5$ are substantially the same as concerns the attenuation and phase shift of the propagating electromagnetic energy. Thus, because of the differential receiver arrangement, the common path T–A–B and the similar paths B–$R_4$ and C–$R_5$ will effectively cancel out and the receivers $R_4$ and $R_5$ will be effectively measuring the path B–C.

However, as discussed in connection with FIG. 1, due to the effects of the borehole, the vertical measurement interval will be more as represented by the path D–E. At any rate, it can be said that an area of the formations which has a vertical extent roughly the same as the receiver spacing $\Delta L$ and which is roughly opposite the receiver array $R_4$–$R_5$ is investigated. It is to be understood that this representation of the energy flow is an over simplified one for the purpose of providing a simple explanation of the measurement technique.

Now concerning the selection of the frequency and transmitter-receiver spacings for the investigation of the invaded zone, it is necessary to select the proper operating frequency $f$ and transmitter to receiver spacing $L_{tr}$ so that the invaded zone measurements will not be influenced by the mud resistivity $R_m$ or the non-invaded zone resistivity $R_t$. It can be said that the receivers should be placed far enough away from the transmitter such that the electromagnetic wave propagating through the mud column is no longer a factor and yet close enough to the transmitters that the electromagnetic wave has not spread out into the noninvaded zone to such an extent as to affect the invaded zone conductivity measurements.

There is another factor which should be considered in determining this transmitter to receiver spacing $L_{tr}$ and that concerns the fact that the conductivity of the various formation zones has an effect on the skin depth of each particular zone. (See Equation 1.) Thus, the expected maximum and minimum skin depth values should desirably be taken into account in determining the transmitter to receiver spacings.

To insure that most of the energy received by the receivers is affected by the invaded zone and not the mud column (borehole) or noninvaded zone, the transmitter to receiver spacing should be at least 1½ times the borehole diameter. Additionally, the transmitter to receiver spacing should be at least as great as ½ the maximum expected skin depth of the invaded zone $\delta_{xo}$ and less than approximately 15 times the minimum expected value of $\delta_{xo}$. This last factor, i.e., $L_{tr} < \delta_{xo(min)}$, also insures that sufficient energy will reach the receivers to provide a measurement.

Concerning the spacing $\Delta L$ between the receivers $R_4$ and $R_5$ this spacing could take on any desired spacing within certain limits. These limits concern the measurement of the phase constant of the propagation constant, i.e., the phase difference of the two receivers. Referring back to FIG. 2 to better understand this, if there is a phase difference between the two vectors $H_{R_1}$ and $H_{R_2}$ of more than 180°, it would be difficult to measure this phase difference. Thus, it can be said that the receiver spacing $\Delta L$ should be less than three times the minimum expected invaded zone skin depth, i.e., $\Delta L < 3\delta_{xo(min)}$. In practice, this receiver spacing $\Delta L$ will be determined in accordance with the desired vertical resolution of the measuring system since, $\Delta L$ determines the vertical resolution, as shown in FIG. 1. Obviously, the receiver spacing is not too important when measuring the attenuation constant, except as concerns the vertical resolution.

One way of looking at this invaded zone investigation, in a simplified manner, is to visualize the electromagnetic field which energizes the receivers as being concentrated in an area located just beyond the last transitional surface between two zones having different conductivities within a cylinder having a radius equal to the spacing between the transmitter and receivers. Thus, for investigating the invaded zone, this last transitional surface would be the surface between the borehole and the invaded zone. Such a transitional surface may be considered as the wall of a wave guide connecting the transmitter with the receivers, which wave guide has considerable losses so that the waves progressing directly inside the wave guide are considerably attenuated.

It would be desirable at this point to demonstrate the effect of the borehole on the invaded zone investigation. Thus, referring to FIG. 4, there is shown a plot of the calculated percent error Y as a function of $$\sqrt{\frac{R_{xo}}{R_m}}$$

for various values of $L_{tr}/\delta_{xo}$. It can be seen from FIG. 4 that the error Y becomes fairly substantial for certain contrast of $R_{xo}/R_m$ when $L_{tr}/\delta_{xo}$ is equal to 0.5. Of course, if the contrast of the invaded zone resistivity $R_{xo}$ to the mud resistivity $R_m$ were sufficiently great, an investigating system wherein the transmitter to receiver spacing $L_{tr}$ were ½ the skin depth $\delta_{xo}$ in the invaded zone would provide sufficiently accurate results. However, since this resistivity contrast may not always be so high, it may be more desirable to select the ratio $L_{tr}/\delta_{xo}$ equal to 1, 2, or more to keep the percent error Y low. By so doing, sufficiently accurate results could be obtained for substantially any contrast of $R_{xo}/R_m$.

It should also be noted here that $R_m$ can easily be determined at the well site and since the range of invaded zone resistivities $R_{xo}$ is generally known for any given geographical region, the frequency of operation can be manually adjusted prior to lowering the investigating apparatus into the borehole to obtain a ratio of $L_{tr}/\delta_{xo}$ sufficiently great to reduce the borehole effect error Y to acceptable levels. This is schematically represented in FIG. 3 by making the oscillator 23, which energizes the transmitter T, a variable frequency oscillator.

It should also be mentioned here that instead of manually adjusting the frequency of variable frequency oscillator 23 before lowering the investigating apparatus in the borehole, a downhole feedback control circuit can be utilized to maintain the skin depth $\delta_{xo}$ constant, and thus the function $L_{tr}/\delta_{xo}$ constant. This is represented by switching double-throw-double pole switch 34 to the position where the signal from the phase or amplitude comparator 26 is applied to one input of a relatively high gain amplifier 39. (Assume for present purposes that the output signal from comparator 26 is a varying DC signal.) A constant voltage signal proportional to the desired value of invaded zone skin depth $\delta_{xo}$ is supplied to the other input of amplifier 39. Amplifier 39 then provides a DC control signal to the variable frequency oscillator 23 proportional to the difference between the desired skin depth value $\delta_{xo(desired)}$ and the measured skin depth value $\delta_{xo(meas.)}$.

In operation, this de-generative feedback arrangement acts to maintain the measured skin depth value $\delta_{xo}$ substantially equal to the desired skin depth value $\delta_{xo(desired)}$ by varying the frequency of variable frequency oscillator 23. Thus, if $\delta_{xo(meas.)}$ is equal to $\delta_{xo(desired)}$, the output signal from amplifier 39 will have zero amplitude. If, however, $\delta_{xo(meas.)}$ should change from the desired value, amplifier 39 will supply sufficient signal amplitude to variable frequency oscillator 23 to always bring about the desired condition, i.e., $\delta_{xo(meas.)}$ substantially equal to $\delta_{xo(desired)}$.

Now, to provide a measure of the conductivity $\sigma_{xo}$, it is only necessary to know the magnitude of the control signal being applied to the variable frequency oscillator 23. This control signal is, of course, proportional to the frequency of variable frequency oscillator 23 since it is controlling the frequency of oscillator 23. Now, since $\delta_{xo}$ is being maintained constant in this case, it is clear that Equation 1 can be rewritten as $$\sigma = \frac{2K_2}{\omega\mu}$$

where $K_2$ is equal to $\delta_{xo}^2$ (desired). Thus, by knowing $\mu$ (i.e. $2\pi f$), the conductivity can be solved for. To provide a signal representative of conductivity to the surface of the earth, the control signal from amplifier 39 is applied to the transmission circuit 27 via the switch 34, instead of the output signal from comparator 26.

Now concerning the investigation of the noninvaded zone, the suggested design procedure for the invaded zone case can apply for the noninvaded zone case also. However, the noninvaded zone skin dept $\delta_t$ is taken into account instead of the invaded zone skin depth $\delta_{xo}$. Also, the radial distance between the center axis of the borehole and the boundary between the invade and noninvaded zones is taken into account instead of the diameter of the borehole.

Thus, for this noninvaded zone case, the transmitter to receiver spacing should desirably be at least ten (10) feet and at least as great as one-half the maximum expected noninvaded zone skin depth $\delta_{t(max)}$ to provide an accurate measure of the noninvaded zone skin dept $\delta_t$, and thus conductivity $\sigma_t$ without influence from the invaded zone. Also, the transmitter to receiver spacing $L_{tr}$ should be short enough so that there will be sufficient energy for the receivers to measure. Since the transmitter to receiver spacing $L_{tr}$ for the noninvaded zone investigation is greater than for the invaded zone, the frequency will more than likely be less for this noninvaded zone case to satisfy the above suggested design procedures. The factors governing the receiver spacing $\Delta L$ will be the same as discussed in connection with the invaded zone case. By following the above suggested design procedure, at least one factor of the propagation constant can be measured to provide a measure of the noninvaded zone skin dept $\delta_t$ and this its conductivity $\sigma_t$.

The electronic apparatus coupled to the transmitter and receivers for investigating the noninvaded zone could be essentially the same as the apparatus shown in FIG. 3 for the invaded zone investigation with the exception that the parameters of the circuits would be somewhat different due to the decreased frequency. However, in block diagram form, the apparatus for investigating the noninvaded zone could be identical with the apparatus for investigating the invaded zone.

It may be desirable to provide apparatus for investigating the invaded and noninvaded zones during the same logging run in the borehole. This can be accomplished by utilizing two separate operating frequencies and two separate antenna receiver arrays. The antenna array for investigating the noninvaded zone would be further removed from the transmitter than that for investigating the invaded zone. This is represented in FIG. 3 by locating a pair of receivers $R_6$ and $R_7$ a sufficient distance below the receivers $R_4$ and $R_5$. A separate oscillator 23a is coupled to the transmitting antenna T for this noninvaded zone investigation. The receivers $R_6$ and $R_7$ are coupled to an electronic circuit 38 which comprise amplifiers, a comparator and a transmission circuit similar to the amplifiers 24 and 25, phase or amplitude comparator 26 and transmission circuit 27 discussed earlier. Both oscillator 23a and circuitry 38 are shown in dotted line form to represent the fact that this dual investigation arrangement is an alternative embodiment. The resulting signal from the electronic circuit 38 is representative of the resistivity or conductivity $\sigma_t$ of the noninvaded zone, while the signal supplied from transmission circuit 27 to the surface to the earth is representative of the invaded zone conductivity $\sigma_{xo}$ or resistivity $R_{xo}$, as discussed earlier. If desired, a variable frequency arrangement could be provided for the investigation of the noninvaded zone in the same manner as for the invaded zone case. This is represented in FIG. 3 by the conductor 38a designated "control frequency of V.F.O. 23a," which conductor would be coupled to an amplifier similar to amplifier 39.

Referring now to FIG. 5, there is shown another embodiment of the present invention for investigating subsurface earth formation through the use of propagating electromagnetic waves. The apparatus of FIG. 5 shows an electrode array located in a borehole 39. The mechanical portions of the downhole investigating apparatus are omitted from the FIG. 5 drawing for purposes of brevity, but are well known in the well logging art. The electrodes of FIG. 5 comprise a current emitting electrode A, a current return electrode B located in close proximity to the current emitting electrode A, and two measure electrodes $M_1$ and $M_2$ located a desired distance below the current emitting and return electrodes. The current emitting and return electrodes A and B can be considered as an electric dipole. Thus, the combination of the current emitting and return electrodes A–B can be considered as the transmitter for transmitting electromagnetic energy into the adjoining formations.

The measure electrodes $M_1$ and $M_2$ are responsive to the electric field portion of the transmitted electromagnetic energy in much the same manner as the receiver coils of FIG. 3 were responsive to the magnetic portion of the propagating electromagnetic energy. Thus, the measure electrodes $M_1$ and $M_2$ can be considered to be receivers and thus the distance between the transmitter electrodes A–B and receiver electrodes $M_1$–$M_2$ is the transmitter to receiver spacing $L_{tr}$. The previously discussed theory applies equally well to the electrode arrangement of FIG. 5 as to the coil arrangement of FIG. 3.

The voltage picked up by the measure electrodes $M_1$ and $M_2$, which voltage is proportional to the electric field portion of the propagating electromagnetic wave at the receivers, are applied to a pair of matched amplifiers 40 and 41. The output signals from amplifiers 40 and 41 are applied to both a phase comparator 38 and an amplitude comparator 39. Since the difference in phase or the amplitude ratio of the signals applied to amplifiers 40 and 41 is measured, it is clear that the ground reference for the downhole electronics circuitry in FIG. 5 can be the cartridge ground, as shown. That is to say, any error in this ground reference potential will have very little, if any, effect on the measurements.

Now concerning the phase comparator 38, the output signals from amplifiers 40 and 41 are individually applied to a pair of voltage limiters 42 and 43 which act to clip the voltage levels of the signals from amplifiers 40 and 41 at a desired constant voltage. The output signals from voltage limiters 42 and 43 are supplied to a phase sensitive deterctor 44, the signal from one of the voltage limiters acting as the phase refereence for the other signal. Thus, since the voltage limiters 42 and 43 remove amplitude variations from the signals supplied to phase sensitive detector 44, phase sensitive detector 44 will supply a varying DC output signal to the surface of the earth which is proportional to the phase difference $\Delta\phi$ between the two signals picked up by measure electrodes $M_1$ and $M_2$.

Now concerning the amplitude comparator 39, the output signals from amplifiers 40 and 41 are rectified by a pair of rectifiers 45 and 46 and the resulting rectified output signals are supplied to a ratio circuit 47 which takes the ratio of the two applied signals. The resulting output signal from ratio circuit 47 is thus a varying DC signal proportional to the ratio $V_{M_2}/V_{M_1}$. Both the amplitude and phase signals are supplied to the surface of the earth to provide indications of conductivity of the adjoining formations. The comparator 26 of FIG. 3 could be constructed like phase or amplitude comparator 38 or 39 of FIG. 5.

There is one other matter which it would be desirable to consider and this is the effect that reflected waves have on the measurements. Reflected waves are electromagnetic waves which reflect off of boundaries, such as bedding plane boundaries. This reflected wave problem may become especially troublesome in connection with the noninvaded zone investigation because of the longer transmitter to receiver spacing $L_{tr}$ for this case thus giving rise to long measured depth intervals which may be in error. However, there may also be a problem with reflected waves in the invaded zone investigation case. This reflected wave problem is represented in FIG. 1 where there is shown an incident electromagnetic wave $H_i$ propagating toward a bedding plane 13 and a reflected wave $H_r$ propagating away from the plane 13.

Now, if the formations are homogeneous and assuming that the antennas are coils thus giving rise to magnetic field quantities, the relationship for the magnetic field strength $H_z$ arising from plane waves at any given point in the formation can be expressed as:

$$H_z = Hi\ e^{+z'/a} + Hr\ e^{-z'/a} \quad (8)$$

where $$a = \frac{1+j}{\delta_F}$$

$Hi$=incident field,
$Hr$=reflected field, and
$z'$ is the distance from the bedding plane 13.

It has been found that if the second difference of the magnetic field is measured, which approximates the second derivative of the field, the measurement will be substantially insensitive to the reflected wave component of Equation 8. Thus, taking the second derivative of Equation 8:

$$\frac{d^2H_z}{dz^2} = \frac{H_z}{a^2} = \lim_{\Delta L \to 0} \frac{-2H_z + 1H_{(z-\Delta L)} + 1H_{(z+\Delta L)}}{(\Delta L)^2} \quad (9)$$

The term on the right-hand side of the last equal sign of Equation 9 is merely the approximate definition of a second derivative. Equation 9 suggests that the reflected wave component of the magnetic field at any given point can be disregarded by placing two receivers having weight of $+1$ each at a distance $\Delta L$ from the main central receiver having a weight of $-2$. To provide a good measure of this second difference, the spacing $\Delta L$ between receivers should be relatively short with respect to one skin depth. The relationship for the conductivity of $\sigma$, derived from Equation 9 is:

$$\sigma = \frac{-2H_z + H_{(z-\Delta L)} + H_{(z+\Delta L)}}{H_z} \times \frac{1}{(\Delta L)^2 j\omega\mu} \quad (10)$$

While Equations 9 and 10 apply for a homogeneous medium, plane wave case, the field equations can be written for spherical wave, nonhomogeneous cases in the same manner and the second derivative of such equation taken to determine the spacings and weights of the various receivers. This same analysis would also hold true for electric field quantities, i.e., electrodes.

Now referring to FIG. 6, there is shown apparatus constructed in accordance with the relationships of Equations 9 and 10. This apparatus includes a coil array comprising coils $R_9$, $R_{10}$, and $R_{11}$ in a borehole 50 arranged in accordance with Equation 9. The receivers $R_9$ and $R_{11}$ are on opposite sides of the central coil $R_{10}$, which has twice as many turns as the coils $R_9$ and $R_{11}$ (to provide the weighing factors of 2, 1 and 1. The coils $R_9$ and $R_{11}$ are in series aiding relationship and the central coil $R_{10}$ is in a series opposing relationship to the coils $R_9$ and $R_{11}$. Thus, coils $R_9$ and $R_{11}$ each have a weight of $+1$ and the coil $R_{10}$ has a weight of $-2$ to satisfy Equation 9. The series connected coil array is connected to an amplifier and rectifier 51 which provides a signal proportional to the numerator of Equation 10. To provide a signal proportional to the denominator of Equation 10 the voltage induced in the central receiver coil $R_{10}$, which is proportional to $2H_z$, is applied to an amplifier and rectifier 52 which provides an output voltage proportional to $2H_z$. This output signal is then weighted by a constant factor $(\Delta L)^2 j\omega\mu/2$ by a weighting network 53 to provide a signal proportional to the denominator term of Equation 10. The outputs from amplifier and rectifier circuit 51 and weighting network 53 are supplied to a ratio circuit 54 which provides an output signal to the surface of the earth proportional to the conductivity $\sigma$ in accordance with Equation 10. If desired, instead of connecting the weighted coils $R_9$, $R_{10}$, and $R_{11}$ in series, this weighting could be accomplished electronically by a weighting network. If the antennas are electrodes, the weighting also could be accomplished with appropriate electronic networks.

It can thus be seen that the present invention has taught a completely different technique for investigating earth formations. While the present invention utilizes electromagnetic energy for investigating subsurface earth formations, it is completely different from the previous static or quasi static electromagnetic types of investigating techniques in that the frequency of operaion is increased to a point where the static and quasi static field theory found in the prior art induction and electrode logging types of investigating systems no longer applies. Instead, the skin depth of the frequency is reduced to a point where dynamic field theory applies and the electromagnetic wave propagates through the formations. Then, by measuring one or both of the propagation constants, i.e., the attenuatin constant or phase constant, the skin depth and thus the conductivity of the adjacent formations can be determined.

By properly selecting the constants of the investigating system, i.e., the antenna spacings and the frequency, desired radial and vertical resolutions can be realized which allow any given formation zone of interest to be investigated. It was shown in the above examples how to select the proper spacings and frequency for investigating the invaded zone and the noninvaded zone. It is to be understood, of course, that through the teachings of the present invention, any other zone or combination of zones of interest could be investigated by properly selecting the spacings and frequency in accordance with the teachings of the present invention.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
    (a) a well tool adapted for movement through a borehole and having an antenna array, said antenna array including at least one transmitting antenna and at least two receiving antennas spaced apart from each other and from said transmitting antenna;
    (b) means for supplying electromagnetic energy to at least one transmitting antenna for emission into the surrounding media, the frequency of the transmitted electromagnetic energy being such that the maximum skin depth of the electromagnetic energy in the formation zone to be investigated is smaller than twice the spacing between the transmitting antenna and a location intermediate of the receiving antennas, the skin depth $\delta$ being expressed by the relationship $$\delta = \sqrt{\frac{2}{\omega \mu \sigma}}$$

where
    $\omega$ is the radian frequency of the propagating electromagnetic energy,
    $\mu$ is the magnetic permeability of the formation zone, and
    $\sigma$ is the conductivity of the formation zone;
    and
    (c) means coupled to said two receiving antennas and responsive to the propagating electromagnetic energy for measuring at least one factor of the propagation constant of at least a portion of the surrounding media.

2. The apparatus of claim 1 wherein the spacing between the two receivers is relatively small compared to the spacing between the transmitter and receivers.

3. The apparatus of claim 1 wherein the frequency of the transmitted electromagnetic energy is also sufficiently low that the spacing between the transmitting and receiving antennas is less than approximately fifteen times the minimum skin depth of the electromagnetic energy in a formation zone to be investigated.

4. The apparatus of claim 1 wherein the spacing between the transmitting antenna and a point between the receiving antennas is at least as great as 1½ times the diameter of the borehole through which the antenna array passes.

5. The apparatus of claim 1 wherein the spacing between said two receiving antennas is less than three times the minimum expected skin depth of electromagnetic energy in the formation zone to be investigated.

6. The apparatus of claim 3 wherein the spacing between the transmitting antenna and a point between the receiving antennas is at least as great as 1½ times the diameter of the borehole through which the antenna array passes.

7. Apparatus for investigating earth formations traversed by a borehole, comprising:
    (a) a well tool having transmitting and receiving antenna means and adapted for movement through a borehole;
    (b) means for energizing the transmitting antenna means to emit electromagnetic energy into the adjacent earth formations at a frequency which enables the electromagnetic energy to propagate through the formations, the frequency of the transmitted electromagnetic energy being such that the maximum skin depth of the electromagnetic energy in the formation zone to be investigated is smaller than twice the spacing between the transmitting and receiving antenna means and said spacing is less than 15 times the minimum expected skin depth of the electromagnetic energy in said formation zone, the skin depth $\delta$ being expressed by the relationship $$\delta = \sqrt{\frac{2}{\omega \mu \sigma}}$$

where
    $\omega$ is the radian frequency of the propagating electromagnetic energy;
    $\mu$ is the magnetic permeability of the formation zone; and
    $\sigma$ is the conductivity of the formation zone;
    and
    (c) means coupled to the receiving antenna means and responsive to the propagating electromagnetic energy for measuring at least one factor of the propagation constant of at least a portion of the earth formations.

8. Apparatus for investigating earth formations traversed by a borehole, comprising:
    (a) a well tool adapted for movement through a borehole and having an antenna array said antenna array including at least one transmitting antenna and at least two receiving antennas spaced apart from each other and from said transmitting antenna;
    (b) means for supplying electromagnetic energy to at least one transmitting antenna for emission into the surrounding media at a frequency which enables the electromagnetic energy to propagate through the surrounding media;
    (c) means electrically coupled to said two receiving antennas and responsive to the propagating electromagnetic energy for measuring at least one factor of the propagation constant of at least a portion of the surrounding media; and
    (d) means responsive to the measured propagation constant factor for computing the conductivity of said at least a portion of the surrounding media.

9. Apparatus for investigating earth formations traversed by a borehole, comprising:
    (a) a well tool adapted for movement through a borehole and having an antenna array, said antenna array including at least one transmitting antenna and at least three receiving antennas spaced apart from each other and from said transmitting antenna, said receiving antennas being relatively closely spaced to one another and coupled to one another in a manner to substantially minimize the effect of reflected electromagnetic energy;
    (b) means for supplying electromagnetic energy to at least one transmitting antenna for emission into the surrouding media at a frequency which enables the electromagnetic energy to propagate through the surrounding media; and
    (c) means electrically coupled to said three receiving antennas and responsive to the propagating electromagnetic energy for measuring at least one factor of the propagation constant of at least a portion of the surrounding media.

10. The apparatus of claim 9 wherein the receiving antenna array comprises one central antenna, an upper antenna and a lower antenna, the receiving antenna array arranged so that the electromagnetic energy received by the central antenna is weighted approximately twice as much as the energy received by the upper and lower antennas and of the opposite polarity therefrom.

11. Apparatus for investigating earth formations traversed by a borehole, comprising:
 (a) a well tool adapted for movement through a borehole and having an antenna array, said antenna array including at least one transmitting antenna and at least two receiving antennas spaced apart from each other and from said transmitting antenna;
 (b) means for supplying continuous sinusoidal electromagnetic energy to at least one transmitting antenna for emission into the surrounding media at a frequency which enables the electromagnetic energy to propagate through the surrounding media; and
 (c) means electrically coupled to said two receiving antennas for comparing the phases of electromagnetic energy received by the two receiving antennas and generating a signal representative of the phase difference between the electromagnetic energy received by the two receiving antennas to produce an indication of the phase constant portion of the propagation constant of at least a portion of the surrounding media.

12. Apparatus for investigating earth formations traversed by a borehole, comprising:
 (a) a well tool adapted for movement through a borehole and having an antenna array, said antenna array including at least one transmitting antenna and at least two receiving antennas spaced apart from each other and from said transmitting antenna;
 (b) means for supplying continuous sinusoidal electromagnetic energy to at least one transmitting antenna for emission into the surrounding media at a frequency which enables the electromagnetic energy to propagate through the surrounding media; and
 (c) means electrically coupled to said two receiving antennas for comparing the amplitudes of electromagnetic energy received by the two receiving antennas and generating a signal representative of the amplitude gradient of the electromagnetic energy received by the two receiving antennas to produce an indication of the attenuation constant portion of the propagation constant of at least a portion of the surrounding media.

13. Apparatus for investigating earth formations traversed by a borehole, comprising:
 (a) an antenna array including transmitting and receiving antennas, adapted for movement through a borehole;
 (b) variable frequency means for supplying electromagnetic energy to at least one transmitting antenna for emission into the surrounding media, the electromagnetic energy propagating through the surrounding media;
 (c) means coupled to at least one receiving antenna spaced apart from said at least one transmitting antenna and responsive to the propagating electromagnetic energy for measuring at least one factor of the propagation constant of at least a portion of surrounding media and generating an output signal representative thereof;
 (d) means responsive to the measured propagation constant factor output signal for generating a control signal to adjust the frequency of the variable frequency means so as to maintain the measured propagation constant factor at a desired value; and
 (e) means responsive to the generated control signal for providing a measure of the conductivity of the surrounding media.

14. A method of investigating earth formations traversed by a borehole, comprising:
 (a) moving an antenna array through a borehole;
 (b) supplying electromagnetic energy to at least one transmitting antenna for emission into the surrounding media at a frequency which enables the electromagnetic energy to propagate through the surrounding media;
 (c) receiving the propagating electromagnetic energy with at least two nearby receiving antennas;
 (d) measuring the gradient of either the amplitude or phase of the propagating electromagnetic field in response to the propagating electromagnetic energy received by said at least two receiving antennas; and
 (e) computing the conductivity of at least a portion of the media surrounding the antenna array using a representation of said measured gradient.

15. A method of investigating earth formations traversed by a borehole, comprising:
 (a) moving an antenna array through a borehole;
 (b) supplying continuous sinusoidal electromagnetic energy to at least one transmitting antenna for emission into the surrounding media at a frequency which enables the electromagnetic energy to propagate through the surrounding media;
 (c) receiving the propagating electromagnetic energy with at least two nearby receiving antennas; and
 (d) comparing the phases of the electromagnetic energy received by the two receiving antennas and generating an output signal representative of the phase difference between the electromagnetic energy received by the two receiving antennas to produce an output signal representative of the phase constant of at least a portion of the surrounding media.

16. A method of investigating earth formations traversed by a borehole, comprising:
 (a) moving an antenna array through a borehole;
 (b) supplying electromagnetic energy to at least one transmitting antenna for emission into the surrounding media at a frequency which enables the electromagnetic energy to propagate through the surrounding media;
 (c) receiving the propagating electromagnetic energy with at least two nearby receiving antennas; and
 (d) comparing the amplitudes of the electromagnetic energy received by the two receiving antennas and generating an output signal representative of the amplitude gradient between the electromagnetic energy received by the two receiving antennas to produce an indication of the attenuation constant of at least a portion of the surrounding media.

17. A method of investigating earth formations traversed by a borehole, comprising:
 (a) moving an antenna array through a borehole;
 (b) supplying electromagnetic energy to at least one transmitting antenna for emission into the surrounding media, the electromagnetic energy propagating through the surrounding media;
 (c) measuring at least one factor of the propagation constant of at least a portion of the surrounding media in response to the propagating electromagnetic energy received by at least one receiving antenna;
 (d) adjusting the frequency of the transmitted electromagnetic energy in response to said at least one measured factor of the propagation constant so as to maintain said measured propagation constant factor at a desired value; and
 (e) generating a signal representative of the conductivity of at least a portion of the surrounding media in response to the amount of adjustment of the frequency.

(References on following page)

References Cited

UNITED STATES PATENTS

| | | | |
|---|---|---|---|
| 2,139,460 | 12/1938 | Potapenko | 324—6X |
| 2,992,325 | 7/1961 | Lehan | 324—6X |
| 3,036,265 | 5/1962 | Ghose | 324—6 |
| 3,052,835 | 9/1962 | Dunlap et al. | 324—6X |
| 3,087,111 | 4/1963 | Lehan et al. | 324—7X |
| 3,123,767 | 3/1964 | Ghose | 324—6 |
| 3,147,429 | 9/1964 | Moran | 324—6 |
| 3,168,694 | 2/1965 | Slattery | 324—6 |
| 3,286,163 | 11/1966 | Holser et al. | 324—6 |
| 3,391,334 | 7/1968 | Ruehle | 324—8 |
| 3,398,356 | 8/1968 | Still | 324—7 |
| 2,233,992 | 3/1941 | Wyckoff | 181—0.5C1 |
| 3,264,555 | 8/1966 | Barret | 324—6 |

GERARD R. STRECKER, Primary Examiner

UNITED STATES PATENT OFFICE
CERTIFICATE OF CORRECTION

Patent No. 3,551,797      Dated December 29, 1970

Inventor(s) M.M.A. Gouilloud and A. Levy

It is certified that error appears in the above-identified patent and that said Letters Patent are hereby corrected as shown below:

IN THE SPECIFICATION

Column 1, line 53, "electode" should read --electrode--;

line 66, "skin effects" should read --skin effect--

Column 3, line 14, "j=√-1" should read --j=$\sqrt{-1}$--;

Column 4, in equation (6) "$\frac{A_2}{A_1}$" should read -- $\frac{A_2}{A_1}$ --;

Column 7, line 23 "Δφ" should read --Δϕ--;

line 35, "emited" should read --emitted--;

Column 9, line 53, "dept" should read --depth--;

line 56, "invade" should read --invaded--;

Column 10, line 1, "dept" should read --depth--;

line 2, "this" should read --thus--;

Column 11, line 16, "deterctor" should read --detector--;

line 17, "refereence" should read --reference--;

Column 12, line 10, after "conductivity" delete "of";

line 28, before "to" delete "(";

Column 12, lines 28 and 29, "weighing" should read --weightin lines 65 and 66, "attenua-tin" should read --attenua-tion--.

Signed and sealed this 16th day of July 1974.

(SEAL)
Attest:

McCOY M. GIBSON, JR.          C. MARSHALL DANN
Attesting Officer               Commissioner of Patents

UNITED STATES PATENT OFFICE
CERTIFICATE OF CORRECTION

Patent No. 3,551,797     Dated December 29, 1970

Inventor(s) Michel Marie Albert Gouilloud et al.

It is certified that error appears in the above-identified patent and that said Letters Patent are hereby corrected as shown below:

Column 5, lines 62 to 64, the equation should appear as shown below:

$$\frac{H'_{R_2} - \frac{1}{e} H'_{R_1}}{H'_{R_1} - H'_{R_1}} = \frac{1}{e}$$

Signed and sealed this 11th day of February 1975.

(SEAL)
Attest:

RUTH C. MASON
Attesting Officer

C. MARSHALL DANN
Commissioner of Patents
and Trademarks